United States Patent [19]
Hirsch

[11] 3,862,193

[45] *Jan. 21, 1975

[54] O-(NITROARYL) OXIMES OF 3-KETO STEROIDS

[75] Inventor: Allen F. Hirsch, Somerville, N.J.

[73] Assignee: Ortho Pharmaceutical Corporation, New Brunswick, N.J.

[ * ] Notice: The portion of the term of this patent subsequent to Nov. 6, 1990, has been disclaimed.

[22] Filed: June 2, 1972

[21] Appl. No.: 259,092

Related U.S. Application Data

[63] Continuation-in-part of Ser. No. 94,530, Dec. 2, 1970, , which is a continuation-in-part of Ser. No. 882,286, Dec. 4, 1969, Pat. No. 3,686,237.

[52] U.S. Cl......... 260/397.3, 260/397.4, 260/397.5, 424/243

[51] Int. Cl.................. C07c 167/00, C07c 169/00

[58] Field of Search............ 260/397.3, 397.4, 397.5

[56] References Cited
UNITED STATES PATENTS 3,686,237  8/1972  Hirsch.............................. 260/397.3

OTHER PUBLICATIONS

Chem. Abst., (1960), p. 11,082(b), or J.A.C.S., Vol. 81, (1959), pages 5,259–5,260, article by Nakanishi et al.

*Primary Examiner*—Elbert L. Roberts
*Attorney, Agent, or Firm*—Benjamin F. Lambert

[57] ABSTRACT

O-(Nitroaryl)oximes of variously substituted 3-keto steroids in which the aryl ring is in turn substituted in the ortho and/or para position with nitro groups are antilittering, anabolic and androgenic agents.

11 Claims, No Drawings

O-(NITROARYL) OXIMES OF 3-KETO STEROIDS

This is a continuation-in-part of application Ser. No. 94,530 filed Dec. 2, 1970 which in turn was a continuation-in-part of application Ser. No. 882,286 filed Dec. 4, 1969, now Pat. No. 3,686,237.

It has been discovered that the O-aryl oximes of variously substituted 3-keto steroids in which the aryl ring is in turn substituted in the ortho and/or para position with nitro groups, and are anabolic and androgenic agents. Additionally many of these compounds are potent antilittering agents especially when administered orally post coitally.

The compounds of this invention are defined by the formula:

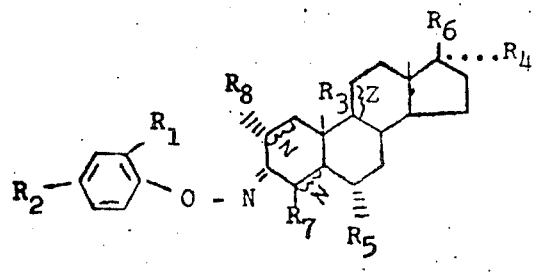

where Z is a carbon to carbon single bond or a carbon to carbon double bond;

$R_1$ and $R_2$ are H or $NO_2$, and at least one of $R_1$ and $R_2$ is $NO_2$;

$R_3$ is H or $CH_3$;

$R_4$ is H or $CH_3$ or $CH_2 - CH_3$ or ethinyl;

$R_5$ is H or $CH_3$;

$R_6$ is hydroxy or the esters thereof, keto, or acetyl;

$R_7$ is hydrogen or halogen, and $R_8$ is H or halogen

The compounds of this class which are potent antilittering are those where:

$R_1$ and $R_2$ are H or $NO_2$, at least one of $R_1$ and $R_2$ being $NO_2$, and when Z is a carbon to carbon single bond $R_2$ is $NO_2$ and $R_1$ is H;

$R_3$ is H or $CH_3$ and where $R_1$ is H, $R_3$ is $CH_3$;

$R_4$ is H or $CH_3$ or $CH_2 - CH_3$ and where $R_1$ is H, $R_4$ is also H;

$R_5$ is H or $CH_3$;

$R_6$ is hydroxy or the esters thereof, keto;

$R_7$ is hydrogen or halogen; and $R_8$ is H or halogen.

The precursor ketones of these antilittering agents are generally ineffective as such and the parent oximes substantially less effective or ineffective.

The compounds are prepared from the parent keto steroids with the properly substituted O-arylhydroxylamine in the presence of an acid catalyst, or alternatively by reacting the oxime of the parent keto steroid with a properly substituted aryl halide in the presence of a suitable base, such as sodium hydride. The parent ketones are well-known in the art as are the methods of their preparation.

When it is desired to prepare a compound such as 3-(p-nitrophenoxy)imino-5α-androstane-17-one wherein the A ring is saturated, it is ineffective to react the starting 3,17 dione with the O-aryl hydroxylamine since there may be substitution in both the 3 and 17 positions. In such a case it is necessary to first prepare a compound such as 3-(p-nitrophenoxy) imino-5 α-androstan-17β-ol by one of the above procedures and thereafter to oxidize the 17β-ol substituent to the corresponding 17-one, preferably with the use of Jones solution.

Various compounds of this invention are prepared as follows:

3-(2′,4′-dinitrophenoxy)imino compounds

I. 3-(2′,4′-dinitrophenoxy)imino-17α-methyl-androst-4-en-17β-ol

In the absence of light, 2 drops of concentrated hydrochloric acid was added to a solution of 2.5 g of methyltestosterone and 1.65 g of O-(2′,4′-dinitrophenyl) hydroxylamine [prepared as described in J. Het. Chem., 4, 413 (1967)] in 200 ml of ethanol. The solution was stirred for 4 hours, concentrated and crystallized from ethanol affording 3.0 g (75 percent) of 3-(2′,4′-dinitrophenoxy)imino-17α-methyl-androst-4-en-17β-ol; m.p. 180–183; ultraviolet maximum ($CH_2CL_2$) at 317 (ε 20,300), 245 (ε 2,800); $[\alpha]_D^{24.9}$ + 134.4 (ethylene chloride).

Anal. Calcd. for $C_{26}H_{33}N_3O_6$: C, 64.58; H, 6.88; N, 8.69.

Found: C, 64.72; H, 6.94; N, 8.74.

II. 3-(2′,4′-dinitrophenoxy) imino-estr-4-en-17β-ol

In the absence of light, 2 drops of concentrated hydrochloric acid was added to a solution of 1.37 g of 19-nortestosterone and 1.0 g of O-(2,4-dinitrophenyl) hydroxylamine in 300 ml of ethanol. The solution was stirred for 4 hours, concentrated and crystallized from ethanol affording 1.67 g (73.2 percent) of 3-(2′,4′-dinitrophenoxy)-imino-estr-4-en-17β-ol; m.p. 107–147; ultraviolet maximum ($CH_2Cl_2$) at 317 (ε 19,800), 245 (ε 2,000); $[\alpha]_D^{23.6}$ + 123.7 (ethylene chloride).

Anal. Calcd. for $C_{24}H_{29}N_3O_6$: C, 63.28; H, 6.42; N, 9.22.

Found: C, 63.12; H, 6.43; N, 9.18

III(A) 3-(2′,4′-dinitrophenoxy)imino-andrasta-1,4-dien-17β-ol

In the absence of light 1.40 g of 1-dehydrotestosterone and 1.0 g of O-(2′,4′-dinitrophenyl) hydroxylamine was dissolved in 350 ml. ethanol and a few drops of concentrated hydrochloric acid added to the solution. The entire mixture was stirred at room temperature for 2 hours. The solution was evaporated to dryness and the resulting light yellow residue crystallized from ethanol; m.p. 106°–112°C, 154°–157°C, ultraviolet ($CH_2Cl_2$) at 325 (ε 22,300), 240 (ε 18,000).

Anal. Calcd. for $C_{25}H_{29}N_3O_6$: C, 64.23; H, 6.25; N, 8.99

Found: C, 64.00; H, 6.33; N, 8.93

III(B) 3-(2′,4′-dinitrophenoxy)imino-androst-4-en-17β-ol

Starting with testosterone and following the procedure of Example I, 3-(2′,4′-dinitrophenoxy)imino-4-androsten-17β-ol is prepared as a light yellow solid having a m.p. of 170.5°–174.0°. Ultraviolet maximum ($CH_2Cl_2$) 315 (ε 19,700); 245 (21.800) $[\alpha]_D^{23.6}$ + 155.0° (ethylene chloride).

Anal. Calcd. for $C_{25}H_{31}N_3O_6$: C, 63.95; H, 6.65; N, 8.95

Found: C, 63.95; H, 6.75; N, 8.79

IV. 17β-enanthyloxy-3-(2′,4′-dinitrophenoxy)imino-androst-4-ene

In the absence of light, a drop of concentrated hydrochloric acid was added to a solution of 3.00 g of androst-4-en-17β-ol-3-one-17-enanthate and 1.5 g of 0-(2,4-dinitrophenyl) hydroxylamine in 500 ml ethanol. The solution was stirred for 3 hours, concentrated, and crystallized from ethanol/affording 3.75 g (86 percent) of 17β-enanthyloxy-3-(2′,4′-dinitrophenoxy)iminoandrost-4-ene; m.p. 118°–123°C; ultraviolet (CH$_2$Cl$_2$) at 318 m$\mu$ ($\epsilon$ 10,500) and 245 m$\mu$ ($\epsilon$ 23,100); $[\alpha]_D^{20.6°}$ + 153° (ethylene chloride).

Anal. Calcd. for C$_{32}$H$_{43}$N$_3$O$_7$: C, 66.07; H, 7.45; N, 7.22
Found: C, 66.29; H, 7.52; N, 7.24

V. 3-(2',4'-dinitrophenoxy)imino-6$\alpha$-methyl-17$\alpha$-acetoxy-pregn-4-en-20-one In the absence of light, 1-2 drops of concentrated hydrochloric acid was added to a solution of 1.86 g of 6$\alpha$-methyl-17$\alpha$-acetoxy-pregn-4-ene-3,20-dione and 1.00 g of 0-(2,4-dinitrophenyl) hydroxylamine in 300 ml of ethanol. After stirring at room temperature for 18 hours, the solution was concentrated under vacuum. The residue was crystallized from ethanol yielding 1.81 g (63 percent) of 3-(2',4'-dinitrophenoxy)imino-17$\alpha$-acetoxy-6$\alpha$-methyl-pregn-4-en-20-one which was subsequently refluxed for 2.5 hours with freshly distilled hexane to remove any ethanol of crystallization. Evaporation of the hexane yielded the compound m.p. 129°–133°; ultraviolet maximum (CH$_2$Cl$_2$) at 315 ($\epsilon$ 18,900), 245 ($\epsilon$ 21,700); $[\alpha]_D^{24.6}$ + 113.0° (ethylene chloride).

Anal. Calcd. C, C$_{30}$H$_{37}$N$_3$O$_8$: C, 63.48; H, 6.57; N, 7.40.
Found: C, 63.38; H, 6.85; N, 7.22.

VI. 3-(2',4'-dinitrophenoxy)imino-19-nor-pregn-4-en-17$\alpha$-ol

In the absence of light, 1.48 g of 17-ethyl-19-nortestosterone and 1.0 g of 0-(2,4-dinitrophenyl) hydroxylamine were dissolved in 350 ml ethanol; and a few drops of concentrated HCl were added to the solution. The total solution was then stirred at room temperature for 1½ hours; and then evaporated to dryness. The resulting pale, yellow residue was crystallized from ethanol yielding 0.63 g (26 percent) of 3-(2',4'-dinitrophenoxy)-imino-19-nor-pregn-4-en-17$\beta$-ol; m.p. 168°–176°C. decomposition; ultraviolet maximum (CH$_2$Cl$_2$) at 316 ($\epsilon$ 19,800), 245 ($\epsilon$ 22,100).

Anal. Calcd. for C$_{26}$H$_{33}$N$_3$O$_6$: C, 64.58; H, 6.88; N, 8.69.
Found: C, 64.50; H, 6.87; N, 8.57.

VII. 3-(2',4'-dinitrophenoxy)imino-19-nor-17$\alpha$-pregn-4-en-20-yn-17-ol

In the absence of light, a mixture of 1.49 g (0.005 moles) of norethindrone, 1 g of 0-(2,4-dinitrophenyl) hydroxylamine (0.005 moles) and 500 ml. of ethyl alcohol was heated to affect solution. To the warm solution was added 5 drops of concentrated hydrochloric acid. The solution was stirred for 1 hour after which time an additional 50 mg of 0-(2,4-dinitrophenyl) hydroxylamine was added. The solution was concentrated under reduced pressure and the residue crystallized from ethanol affording 1.61 g of yellow crystals which melted at 179°–184°C; ultraviolet maximum (CH$_2$Cl$_2$) at 427 ($\epsilon$ 20,500), 408 ($\epsilon$ 19,500).

Anal. Calcd. for C$_{26}$H$_{29}$N$_3$O$_6$: C, 65.12; H, 6.10; N, 8.76.
Found: C, 65.29; H, 6.25; N, 8.87

VIII. 3-(2',4'-dinitrophenoxy)imino-5$\alpha$-androstan-17$\beta$-ol 0.96 grams of sodium hydride was added to a solution of 6.30 grams of dihydrotestosterone oxime in 50 ml. of tetrahydrofuran. After refluxing for 1 hour, 50 ml. of dimethyl sulfoxide and 14 grams of 2,4 dinitrofluorobenzene were added. The solution was refluxed for three minutes, poured into water and filtered. Upon chromatography on a column eluted with a mixture of 90 parts chloroform and 10 parts acetone, and subsequent crystallization from ethanol there was obtained 3.70 g of product, m.p. 108°–111°C. ultraviolet (CH$_2$Cl$_2$) at 307 ($\epsilon$ 15,900).

Anal. Calcd. for C$_{25}$H$_{35}$N$_5$O$_6$; C, 63.68; H, 7.05; N, 8.91
Found: C, 63.68; H, 7.12; N, 8.98

IX. 17$\beta$-acetoxy-3-(2',4'-dinitrophenoxy)imino-5$\alpha$-androstane

In the absence of light, a drop of concentrated hydrochloric acid was added to a solution of 2.98 g of dihydrotesterone-acetate and 1.8 g of 0-(2,4-dinitrophenyl) hydroxylamine in 200 ml. methanol. The solution was refluxed, with stirring, for one hour, concentrated, washed with water, and crystallized from ethanol affording 3.25 g (71 percent) of 17$\beta$-acetoxy-3-(2',4'-dinitrophenoxy)imino-5$\alpha$-androstane; m.p. 175°–177°C; ultraviolet (CH$_2$Cl$_2$) at 307 ($\epsilon$ 16,800); $[\alpha]_D^{26.7°}$ + 29.6° (ethylene chloride).

Anal. Calcd. for C$_{27}$H$_{35}$N$_3$O$_7$: C, 63.14; H, 6.87; N, 8.18
Found: C, 63.22; H, 6.85; N, 8.14

X. 17$\alpha$-methyl-3-(2',4'-dinitrophenoxy)imino-androsta-4,9(11)-dien-17$\beta$-ol In the absence of light, a drop of concentrated hydrochloric acid was added to a solution of 2.15 g of androsta-4,9(11)-dien-17$\beta$-ol-3-one and 1.5 g of 0-2,4-dinitrophenyl) hydroxylamine in 500 ml. ethanol. The solution was stirred for 3 hours, concentrated, and crystallized from ethanol affording 2.05 g (60 percent) of 17$\alpha$-methyl-3-(2',4'-dinitrophenoxy)imino-androsta-4,9(11)-dien-17$\beta$-ol; m.p. 168°–172°C.; ultraviolet (CH$_2$Cl$_2$) at 318 m$\mu$ ($\epsilon$ 20,800) and 247 m$\mu$ ($\epsilon$ 22,900); $[\alpha]_D^{24.7°C}$ + 122 (ethylene chloride).

Anal. Calcd. for C$_{26}$H$_{32}$N$_3$O$_6$: C, 64.71; H, 6.68; N, 8.70
Found: C, 64.74; H, 6.56; N, 8.71

3-(p-nitrophenoxy)imino compounds

XI. 3-(p-nitrophenoxy)imino-androsten-4-en-17$\beta$-ol

To a solution of 1.33 g of tert-butyl N-hydroxy carbamate and 0.66 g of potassium hydroxide (85 percent) dissolved in 20 ml. of ethanol was added dropwise a solution of 1.41 g of p-fluoronitrobenzene in 20 ml. of ethanol. The solution was stirred for 18 hours, poured onto ice water and the resulting solid filtered and washed well with water. Crystallization from benzene-hexane afforded 2.15 g (84.5 percent) of tert-butyl N-(p-nitrophenoxy) carbamate as white crystals, m.p. 106°–108°.

Anal. Calcd. for C$_{11}$H$_{14}$N$_2$O$_5$: C, 51.97; H, 5.55; N, 11.02.
Found: C, 51.80; H, 5.62; N, 11.18.

A solution of 12 g of tert-butyl N-(p-nitrophenoxy) carbamate in 45 ml. of trifluoroacetic acid was stirred for 15 minutes, poured onto 300 ml. of ice water, filtered and the solid dried. The mother liquor was neutralized with potassium carbonate affording additional product. The total yield of combined product was 5.49 g (75.5 percent) which was subsequently crystallized from ethanol yielding pure 0-(p-nitrophenyl) hydroxylamine; m.p. 126.5°–128°; ultraviolet maximum (CH$_2$Cl$_2$) at 308 ($\epsilon$ 11,400).

Anal. Calcd. for C$_6$H$_6$N$_2$O$_3$: C, 46.76; H, 3.92; N, 18.18
Found: C, 46.94; H, 3.87; N, 18.00.

In the absence of light, 2 drops of concentrated hydrochloric acid was added to a solution of 1.39 g of testosterone and 0.75 g of 0-(p-nitrophenyl)hydroxylamine in 175 ml. of ethanol. The solution was stirred for 3 hours, concentrated and crystallized from ethanol affording 1.52 g (74 percent) of 3-(p-nitrophenoxy)imino-androst-4-en-17$\beta$-ol; m.p.

133.5–188; ultraviolet maximum (CH$_2$Cl$_2$) at 328 ($\epsilon$ 18,300), 260 ($\epsilon$ 13,200); [$\alpha$]$_D^{23.9}$ + 165.3° (ethylene chloride).

Anal. Calcd. for C$_{25}$H$_{32}$N$_2$O$_4$: C, 70.73; H, 7.60; N, 6.60
Found: C, 70.81; H, 7.41; N, 6.44

XII. 3-(p-nitrophenoxy)imino-17α-methyl-androst-4-en-17β-ol

In the absence of light, 2 drops of concentrated hydrochloric acid was added to a solution of 1.51 g of methyltestosterone and 0.77 mg of 0-(p-nitrophenyl) hydroxylamine in 175 ml. of ethanol. After stirring for 2½ hours, the solution was concentrated and crystallized from ethanol affording 1.46 g (67 percent) of 3-(p-nitrophenoxy)imino-17α-methylandrost-4-en-17β-ol; m.p. 180–184; ultraviolet maximum (CH$_2$Cl$_2$) at 326 ($\epsilon$ 17,600), 360 ($\epsilon$ 12,900); [$\alpha$]$_D^{24}$ + 150.1 (ethylene chloride).

Anal. Calcd. for C$_{26}$H$_{34}$N$_2$O$_4$: C, 71.21; H, 7.81; N, 6.39
Found: C, 71.36; H, 7.94; N, 6.48

XIII. 3-(p-nitrophenoxy)imino-estr-4-en-17β-ol

In the absence of light 2 drops of concentrated hydrochloric acid was added to a solution of 2.09 g of 19-nortestosterone and 0.93 g of 0-(p-nitrophenyl) hydroxylamine in 200 ml. of ethanol. After stirring for 24 hours the solution was concentrated and crystallized from ethanol affording 1.29 g (41.5 percent) of 3-(p-nitrophenoxy)imino-estr-4-en-17β-ol; m.p. 174–184; ultraviolet maximum (CH$_2$Cl$_2$) at 257 ($\epsilon$ 14,200), 327 ($\epsilon$ 20,100); [$\alpha$]$_D^{31.1}$ + 137.0 (ethylene chloride).

Anal. Calcd. for C$_{24}$H$_{30}$N$_2$O$_4$: C, 70.22; H, 7.37; N, 6.82
Found: C, 70.27; H, 7.45; N, 6.89

XIV. 17β-Acetoxy-3-(p-nitrophenoxy)imino-5α-androstane

To a solution of 2.16 g of 5α-dihydrotestosterone acetate and 1.0 g of 0-(p-nitrophenyl) hydroxylamine in 200 ml. of ethanol was added 2 drops of concentrated hydrochloric acid. The solution was stirred for 3 hours, concentrated and crystallized from ethanol affording 1.954 g (64 percent) of 17β-acetoxy-3-(p-nitrophenoxy)imino-5α-androstane; m.p. 173–175; ultraviolet maximum (CH$_2$Cl$_2$) at 320 ($\epsilon$ 15,900); [$\alpha$]$_D^{23.2}$ + 27.7 (ethylene chloride).

Anal. Calcd. for C$_{27}$H$_{36}$N$_2$O$_5$: C, 69.21; H, 7.74; N, 5.98
Found: C, 69.13; H, 7.69; N, 5.94.

XV. 3-(p-Nitrophenoxy)imino-5α-androstan-17β-ol

To a solution of 3.05 g of dihydrotestosterone oxime in 50 ml. of tetrahydrofuran was added 0.48 g of sodium hydride (62.4 percent). After refluxing for one hour, 50 ml. of dimethyl sulfoxide and 1.41 g of p-fluoronitrobenzene were added. The solution was refluxed 5 minutes and poured into water. The precipitate was filtered and crystallized from ethanol affording 1.60 g (38 percent) of 3-(p-Nitrophenoxy)imino-5α-androstan-17β-ol; m.p. 170°–173°C.; ultraviolet (CH$_2$Cl$_2$) at 319 mµ ($\epsilon$ 16,200); [$\alpha$]$_D^{75 \circ C}$ + 6° (ethylene chloride).

Anal. Calcd. for C$_{25}$H$_{34}$N$_2$O$_4$: C, 70.40; H, 8.03; N, 6.57
Found: C, 70.36; H, 8.11; N, 6.54

XVI. 3-(p-nitrophenoxy)imino-androst-4-en-17-one

In the absence of light, 2 drops of concentrated hydrochloric acid was added to a solution of 1.86 g of androstenedione and 1.0 g of 0-(p-nitrophenyl) hydroxylamine in 200 ml. of ethanol. The solution was stirred for 6.5 hours, concentrated and crystallized from ethanol affording 1.14 g (41.5 percent) of 3-(p-nitrophenoxy)imino-androst-4-en-17-one; m.p. 193-198; ultraviolet maximum (CH$_2$Cl$_2$) at 327 ($\epsilon$ 20,700), 257 ($\epsilon$ 14,300), 232 ($\epsilon$ 17,200); [$\alpha$]$_D^{22.4}$ + 219.3 (ethylene chloride).

Anal. Calcd. for C$_{25}$H$_{30}$N$_2$O$_4$: C, 71.07; H, 8.16; N, 6.63.
Found: C, 71.04; H, 7.06; N, 6.56.

XVII. 3-(p-nitrophenoxy)-4-chloro-17-acetoxy-androst-4-ene

In the absence of light, 2 drops of concentrated hydrochloric acid was added to a solution of 2.37 g of 4-chlorotestosterone acetate and 1.0 g of 0-(p-nitrophenyl) hydroxylamine in 800 ml. of ethanol. The solution was stirred for 2 days, concentrated and crystallized from methylene chloride: ethanol affording 1.44 g (44.3 percent) of 3-(p-nitrophenoxy)imino-4-chloro-17-acetoxy-androst-4-ene; m.p. 219–219.5; ultraviolet maximum (CH$_2$Cl$_2$) at 320 ($\epsilon$ 22,400), 260 ($\epsilon$ 14,000), 234 ($\epsilon$ 11,900); [$\alpha$]$_D^{24.1}$ + 120.8 (ethylene chloride).

Anal. Calcd. for C$_{27}$H$_{33}$N$_2$O$_5$Cl: C, 64.72; H, 6.63; N, 5.59; Cl, 7.07.
Found: C, 64.84; H, 6.66; N, 5.61; Cl, 7.02

XVIII. 3-(p-nitrophenoxy)imino-17α-pregn-4-en-20-yn-17β-ol

In the absence of light, 2 drops of concentrated hydrochloric acid was added to a solution of 2.03 g of ethisterone and 1.0 g of 0-(p-nitrophenyl) hydroxylamine in 900 ml. of ethanol. The solution was stirred for 24 hours, concentrated and crystallized from ethanol affording 1.99 g (68.2 percent) of 3-(p-nitrophenoxy)imino-17α-pregn-4-en-20-yn-17β-ol; m.p. 111–159; ultraviolet maximum (CH$_2$Cl$_2$) at 327 ($\epsilon$ 20,400), 258 ($\epsilon$ 13,300), 232 ($\epsilon$ 17,500); [$\alpha$]$_D^{26.3}$ + 127.7 (ethylene chloride).

Anal. Calcd. for C$_{27}$H$_{32}$N$_2$O$_4$: C, 72.30; H, 7.19; N, 6.25.
Found: C, 72.11; H, 7.12; N, 6.15.

Using conventional esterification methods, the following esters of the product of Example XV were prepared:

XIX. 17β-propionoxy-3-(p-nitrophenoxy)imino-5α-androstane

XX. 17β-enanthyloxy-3-(p-nitrophenoxy)imino-5α-androstane

XXI. 17β-butyroxy-3-(p-nitrophenoxy)imino-5α-androstane  XXII  17β-acetoxy-2α-bromo-3-(p-nitrophenoxy)imino-5α-androstane To a solution of 1 g of 17β-acetoxy-2α-bromo-5α-androstane-3-one in ethanol was added 0.370g of 0-(p-nitrophenyl)hydroxylamine and a drop of concentrated hydrochloric acid. It was stirred for two hours and the solvent taken off. Crystalization from ethanol afforded 1.14g (84 percent) of white crystals; mp. 180°–183°C; ultraviolet (CH$_2$Cl$_2$) at 313 ($\epsilon$-16,200).

Anal. Calcd. for C$_{27}$H$_{35}$N$_2$O$_5$Br : C, 59.23; H, 6.44; N, 5.17; Br, 14.59.
Found: C, 59.40; H, 6.30; N, 5.08; Br, 14.57

XXIII. 3-(p-nitrophenoxy)imino-5α-androstane-17-one

To a solution of 5g of 3-(p-nitrophenoxy)imino-5α-androstane-17β-ol and 150 ml of acetone kept in an ice bath was added dropwise 4.5 ml of Jones solution. This was stirred for three hours and poured into ice water. It was filtered and washed with H$_2$O. Crystalization from a benzene/hexane solution afforded 4.3g (88 percent) of 3-(p-nitrophenoxy)imino-5α-androstane-17-one; mp. 170°–172°, ultraviolet (CH$_2$Cl$_2$) at 318 mµ ($\epsilon$m = 15,900).

Anal. Calcd. for $C_{25}H_{32}O_4N_2$: C, 70.73; H, 7.60; N, 6.60.
Found: C, 70.36; H, 7.71; N, 6.47.

XXIV. 17β-Acetoxy-2α-chloro-3-(p-nitrophenoxy) imino-5α-androstane

To a solution of 2g of 17β-acetoxy-2α-chloro-5α-androstan-3-one in ethanol was added 0.84g of 0-(p-nitrophenyl) hydroxylamaine and a drop of concentrated hydrochloric acid. The mixture was stirred overnight and filtered. Crystallization from ethanol afforded 2.1g (77 percent) of white crystals; m.p. 170°–172°C.
Anal. Calcd. for $C_{27}H_{35}O_5H_2Cl$: C, 64.47; H, 7.01; N, 5.57 Cl, 7.05.
Found: C, 64.47; H, 7.13; N, 5.60; Cl, 7.04

XXV. 2α-Chloro-5α-androstan-17β-ol-3-one

To a solution of 0.5g of 17β-acetoxy-2α-chloro-5α-androstan-3-one in 250 ml of methanol was added 2 ml of concentrated hydrochloric acid. After refluxing for 1½ hours, the solution was concentrated, dissolved in methylene chloride, washed with sodium bocarbonate and dried. Crystallization from ethanol afforded 0.33g (75 percent) of white crystals; m.p. 190°–193°C.
Anal. Calcd. for $C_{19}H_{29}O_2Cl$: C, 70.25; H, 9.02; Cl, 10.91
Found: C, 70.21; H, 8.95; Cl, 10.95.

XXVI. 2α-Chloro-3-(p-nitrophenoxy) imino-5α-androstan-17β-ol

To a solution of 5g of 2α-chloro-5α-androstan-17β-ol-3-one in ethanol was added 2.37g of O -(p-nitrophenyl) hydroxylamine and a drop of concentrated hydrochloric acid. It was stirred overnight and filtered. Crystallization from ethanol afforded 3g (44 percent) of white crystals; m.p. 181°–181.5°C.
Anal. Calcd. for $C_{25}H_{33}N_2O_4Cl$: C, 65.14; H, 7.21; N, 6.08; Cl, 7.69.
Found: C, 64.50; H, 7.32; N, 6.14; Cl, 7.82

XXVII. 2α- Chloro-3-(p-nitrophenoxy) imino-5α-androstan-17-one

The procedure of Example XXIII was repeated using 2.5g of 2α-chloro-3-(p-nitrophenoxy) imino-5α-androstan-17β-ol instead of the 2-unsubstituted imino compound, and 10 ml of Jones solution instead of 4.5 ml thereof. Crystallization from ethanol afforded 2g (80 percent) of white crystals; m.p. 202°–203°C.
Anal. Calcd. for $C_{25}H_{31}N_2O_4Cl$: C, 65.42; H, 6.81; N, 6.10; Cl, 7.72.
Found: C, 64.84; H, 6.92; N, 6.07; Cl, 7.77

XXVIII. 2α-Bromo-3-(p-nitrophenoxy) imino-5α-androstan-17β-ol

Following the procedure of Example XXVI and using equivalent amounts of the corresponding 2α-bromo starting material and the hydroxylamine compound, the subject compound is obtained. Crystallization from ethanol afforded 2g (83 percent) of white crystals; m.p. 165.5°–166°C.
Anal. Calcd. for $C_{25}H_{33}N_2O_4Br$: C, 59.40; H, 6.58; N, 5.54; Br, 15.80
Found: C, 59.45; H, 6.58; N, 5.46; Br, 15.84

XXIX. 2α-Bromo-3-(p-nitrophenoxy) imino-5α-androstan-17-one

Following the procedure of Example XXVII and using the product of Example XXVIII as the starting material, the subject compound was obtained. Crystallization from ethanol afforded 1.1g (75 percent) of white crystals; m.p. 184°–185°C.
Anal. Calcd. for $C_{25}H_{32}N_2O_4Br$: C, 59.52; H, 6.39; N, 5.55; Br, 15.38.
Found: C, 60.03; H, 6.28; N, 5.71; Br, 14.82

XXX. 2-(2'-Hydroxy-5'-nitrophenyl)-17β-acetoxy-5α-androstan-3-one

To a solution of 54g of 17β-acetoxy-3-(p-nitrophenoxy) imino-5α-androstane in 3000 ml of acetic acid was added 344 ml of a hydrochloric acid/acetic acid solution (7.34 g/600 ml). After stirring overnight the solution was poured into ice water and filtered. Crystallization from chloroform/hexane afforded 31g (57 percent) of white crystals; m.p. 225°–226°C.
Anal. Calcd. $C_{27}H_{35}NO_6$: C, 69.09; H, 7.51; N, 2.98
Found C, 68.84; H, 7.53; N, 2.98

XXXI. 2-(2'-Hydroxy-5'-nitrophenyl)-3-(p-nitrophenoxy) imino-17β-acetoxy-5α-androstane Following the procedure of Example XXVI and using the product of Example XXX as a starting material, the subject compound was obtained. Crystallization from ethanol afforded 1.3g (50 percent) of white crystals; m.p. 173°–175°C.
Anal. Calcd. $C_{33}H_{39}N_3O_8$: C, 65.44; H, 6.49; N, 6.94
Found: C, 65.53; H, 6.66; N, 6.76

XXXII. 2-(2'-hydroxy-5'-nitrophenyl)-3-(2', 4'-dinitrophenoxy) imino-17β-acetoxy-5α-androstane Following the procedure of Example I and using equivalent amounts of the product of Example XXX, the subject compound was obtained. Crystallization from ethanol afforded 1.6g (58 percent) of white crystals; m.p. 208°–209°C.
Anal. Calcd. for $C_{33}H_{38}N_4O_{10}$: C, 60.91; H, 5.89; N, 8.61
Found: C, 60.67; H, 5.74; N, 8.52

As noted previously many compounds of this invention are potent antilittering agents. Antilittering activity is measured as follows:

A test group of rats is fed a calculated amount of a test substance in the feed for a period of 7 days during which time males and females are kept separate with both sexes receiving the test substance. Thereafter, the males and females are cohabited and the diet fed is continued for 15 days. At the end of this time the cohabitation is ended and the drug removed from the diet, the females are then observed for a period of 21 days and are allowed to deliver their young, if any, and to raise them. A control group of rats is handled in precisely the same way at the same time except that their diet does not include the test substance.

The following table illustrates the percentage of rats which give birth at the dosage level indicated.

| Compound of Example | Dosage Level mg/kg | | % of Animals Giving Birth |
|---|---|---|---|
| I | 10 (theory) | 8.8 (actual) | 0 |
| II | 10 | 8.3 | 0 |
| IIIB | 20 | 15.2 | 0 |
| IV | 20 | 17.4 | 0 |
| V | 20 | 18.9 | 0 |
| XIV | 40 | 13.2 | 12.5 |

These compounds also exhibit post coital antilittering properties when administered on days 9–12 after coitus to the rat. The following table illustrates the percentage of resorptions obtained at the indicated dosage levels. The activity of the parent ketone and unsubstituted oxime is also noted.

| Compound of Example | Dosage Level mg/kg | % Resorptions Compound | % Resorptions Parent Ketone | Oximes |
|---|---|---|---|---|
| II | 20 | 100 | | 39.5 |
|  | 40 | | 20.6 | |
| IIIA | 40 | 100 | | |
| IIIB | 10 | 80 | | |
|  | 40 | | 8.2 | 91.2 |
| XI | 40 | 100 | | |
| XIV | 2.5 | 96.6 | | |
|  | 20 | | | 2.5 |
|  | 40 | | 5.0 | |
| XV | 2.5 | 100 | | |
|  | 20 | 100 | | |
|  | 40 | | 6.9 | 1.6 |
| XIX | 5.0 | 100 | | |
| XX | 5.0 | 100 | | |
| XXI | 40.0 | 100 | | |
| XXII | 2.5 | 100 | | |
|  | 5.0 | | 0.0 | |
| XXIII | 5.0 | 100 | 0.0 | |
| XXIV | 2.5 | 100 | | |
| XXVI | 5.0 | 100 | | |
|  | 30.0 (Administered days 1-12) | | 6.7 | |
| XXVII | 1.0 (Administered days 10-13) | 97.4 | | |
| XXVIII | 2.5 | 100 | | |
| XXIX | 2.5 | 100 | | |
| XXXI | 35.0 (Administered days 1-12) | 0 | | |
| XXXII | 40.0 (Administered days 1-12) | 80.9 | | |
|  | 23.5 | | 4.4 | |
|  | 34.4 (Administered days 1-12) | | | 1.6 |

While all of the compounds are at least weak anabolic agents, a number of the compounds are unusually potent anabolic agents. The compound of Example II has a ventral prostate potency of 0.15 as compared to methyltestosterone and a levator ani potency of 2.1 when compared to methyltestosterone. Thus the anabolic:androgenic ratio is very favorable. This is also true of the compound of Example VI which has an anabolic:androgenic ratio of 12.5 with a ventral prostate potency of 0.18 and a levator ani potency of 2.24 when compared to methyl testosterone, and the compound of Example X which has a ventral prostate potency of 1.9 and a levator ani potency of 4.6.

XXXIII. The compound of Example XXXI is a highly antiandrogenic material as is evidenced by the following experiment.

Immature male rats, Wistar strain, 50 gm, were castrated under ether anesthesia. Two groups of 5 rats each were used, one as a control receiving only methyl testosterone, and the other as a treated group receiving methyl testosterone and drug.

The test material was administered per os in 0.2 ml sesame oil. Each dose (about 6.5 mg/rat/day) was administered daily for 7 days commencing on the day of castration. A total dose of 2.0 mg of methyl testosterone (MET) was administered concomitantly each day (about 0.3 mg/rat/day).

The animals were sacrificed (chloroform) 24 hours after the last drug administration. The ventral prostates were removed, cleaned of surrounding fat and connective tissue, incised and pressed on damp, No. 1 Whatman filter paper to express any contained fluid and weighed to the nearest 0.1 mg on a Mettler analytical balance. The percentage weight gain of the treated rats was substantially the same as that of the controls. The weight of the prostate of each treated animal which also received methyl testosterone was significantly reduced compared to the weight of the prostate from the rats receiving methyl testosterone alone. These weights are shown in the table below:

|  | Rat | Ventral Prostate Weight, Mg |
|---|---|---|
| Control Group | 1 | 47.6 |
|  | 2 | 43.2 |
|  | 3 | 32.7 |
|  | 4 | 46.0 |
|  | 5 | 37.0 |
|  |  | 41.3 mean |
| Treated Group | 6 | 16.5 |
|  | 7 | 31.5 |
|  | 8 | 25.0 |
|  | 9 | 41.4 |
|  | 10 | 43.5 |
|  |  | 31.6 mean |

From the above it can be seen that the weight of the prostates from treated animals who also received methyl testosterone was significantly reduced (22.8 percent reduction) over those from rats not treated.

What is claimed is:

1. Compounds of the formula:

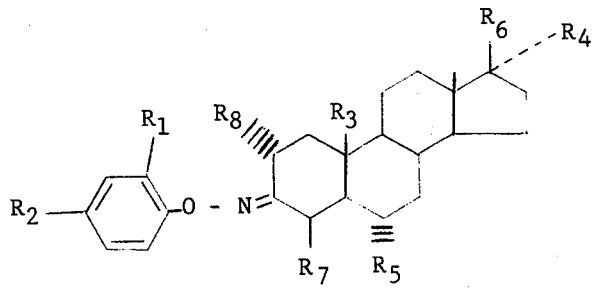

where $R_1$ and $R_2$ are H or $NO_2$, and at least one of $R_1$ and $R_2$ is $NO_2$;
$R_3$ is H or $CH_3$
$R_4$ is H or $CH_3$ or $CH_2$-$CH_3$ or ethinyl;
$R_5$ is H or $CH_3$
$R_6$ is hydroxy, alkyl esters having 2–7 carbon atoms, keto or acetyl;
$R_7$ is hydrogen or halogen and $R_8$ is hydrogen or halogen.

2. Compounds of claim 1 wherein
$R_2$ is $NO_2$ and $R_1$ is H;
$R_3$ is $CH_3$;
$R_4$ is H;
$R_5$ is H or $CH_3$;
$R_6$ is hydroxy, alkyl esters having 2–7 carbon atoms or keto;
$R_7$ is hydrogen or halogen; and $R_8$ is hydrogen or halogen.

3. 17β-acetoxy-2α-chloro-3-(p-nitrophenoxy) imino-5α-androstane of claim 1.
4. 2α-chloro-5α-androstan-17β-ol-3-one.
5. 2α-chloro-3-(p-nitrophenoxy) imino-5α-androstan-17β-ol of claim 1.
6. 2α-chloro-3-(p-nitrophenoxy) imino-5α-androstan-17-one of claim 1.
7. 2α-bromo-3-(p-nitrophenoxy) imino-5α-androstan-17β-ol of claim 1.
8. 2α-bromo-3-(p-nitrophenoxy) imino-5α-androstan-17-one of claim 1.
9. 2-(2'-hydroxy-5'-nitrophenyl)-17β-acetoxy-5α-androstan-3-one.
10. 2-(2'-hydroxy-5'-nitrophenyl)-3-(p-nitrophenoxy) imino-17β-acetoxy-5α-androstane.
11. 2-(2'-hydroxy-5'-nitrophenyl)-3-(2', 4'-dinitrophenoxy) imino-17β-acetoxy-5α-androstane.

* * * * *

PO-1050
(5/69)

UNITED STATES PATENT OFFICE
CERTIFICATE OF CORRECTION

Patent No. 3,862,193  Dated January 21, 1975

Inventor(s) Allen F. Hirsch

It is certified that error appears in the above-identified patent and that said Letters Patent are hereby corrected as shown below:

In Column 1, line 10, delete "and" before "are anabolic".

In Column 2, lines 62-63, "andros-t-4" should read --- androst-4 ---.

In Column 3, line 3, "$(\alpha)$" should read --- $[\alpha]$ ---.

In Column 3, line 23, "Anal.Calcd. C, $C_{30}$" should read --- Anal.Calcd. for $C_{30}$ ---.

In Column 4, line 4, ";" should read --- : --- after $C_{25}H_{35}N_5O_6$ ---.

In Column 4, line 10, "dihydrotesterone" should read --- dihydrotestosterone ---.

In Column 4, line 24, "O-2,4-" should read --- O-(2,4- ---.

In Column 7, line 8, "hydroxylamaine" should read --- hydroxylamine ---.

In Column 7, line 13, "$C_{27}H_{35}O_5H_2Cl$" should read --- $C_{27}H_{35}O_5N_2Cl$ ---.

In Column 7, line 66, "184°-185°C" should read --- 184.5°-185°C ---.

Signed and sealed this 24th day of June 1975.

(SEAL)
Attest:

RUTH C. MASON
Attesting Officer

C. MARSHALL DANN
Commissioner of Patents
and Trademarks